(12) United States Patent
Weaver et al.

(10) Patent No.: US 7,954,631 B1
(45) Date of Patent: Jun. 7, 2011

(54) CHAIN LINK CONVEYOR FOR USE IN MATERIAL HANDLING EQUIPMENT

(75) Inventors: Frank Nevin Weaver, Narvon, PA (US); Frank Nolt Weaver, Narvon, PA (US)

(73) Assignee: Weaverline, LLC, Churchtown, PA (US)

( * ) Notice: Subject to any disclaimer, the term of this patent is extended or adjusted under 35 U.S.C. 154(b) by 277 days.

(21) Appl. No.: 12/236,202

(22) Filed: Sep. 23, 2008

(51) Int. Cl.
*B65G 19/00* (2006.01)
(52) U.S. Cl. .................... 198/729; 198/465.3
(58) Field of Classification Search .......... 198/729, 198/728
See application file for complete search history.

(56) References Cited

U.S. PATENT DOCUMENTS

| | | | |
|---|---|---|---|
| 3,760,770 A | 9/1973 | Weaver et al. | |
| 4,682,687 A | 7/1987 | Leege et al. | |
| 4,744,211 A | 5/1988 | Abe | |
| 4,787,400 A * | 11/1988 | Tanis | 460/114 |
| 4,815,270 A | 3/1989 | Lapeyre | |
| 4,815,271 A | 3/1989 | Lapeyre | |
| 4,882,901 A | 11/1989 | Lapeyre | |
| 4,908,002 A * | 3/1990 | Tanis | 460/114 |
| 4,944,388 A | 7/1990 | Dalferth | |
| 4,950,398 A * | 8/1990 | Wiegand et al. | 210/232 |
| 5,000,311 A | 3/1991 | Abbestam et al. | |
| 5,065,670 A * | 11/1991 | Leiweke | 99/405 |
| 5,065,860 A | 11/1991 | Faulkner | |
| 5,069,328 A * | 12/1991 | Schupphaus et al. | 198/731 |
| 5,088,594 A * | 2/1992 | Edmondson | 198/731 |
| 5,165,522 A | 11/1992 | Uttke et al. | |
| 5,253,749 A | 10/1993 | Ensch | |
| 5,337,886 A * | 8/1994 | Anderson et al. | 198/728 |
| 5,369,833 A * | 12/1994 | Uttke et al. | 15/84 |
| 5,511,651 A * | 4/1996 | Barth | 198/817 |
| 5,586,640 A | 12/1996 | Kraut | |
| 5,628,178 A | 5/1997 | Beckham | |
| 6,161,682 A * | 12/2000 | Sarig | 198/804 |
| 6,273,239 B1 * | 8/2001 | Crunkelton | 198/728 |
| 6,279,752 B1 * | 8/2001 | Hannum | 210/525 |
| 6,290,453 B1 * | 9/2001 | Corniani et al. | 414/798.9 |
| 6,378,693 B1 * | 4/2002 | Ballestrazzi et al. | 198/732 |
| 6,571,936 B1 * | 6/2003 | Melhuish et al. | 198/731 |
| 6,662,932 B1 * | 12/2003 | O'Neill | 198/730 |
| 6,662,933 B2 * | 12/2003 | De Guglielmo et al. | 198/732 |
| 6,691,856 B1 * | 2/2004 | Prakken | 198/419.3 |
| 6,964,550 B2 * | 11/2005 | Hafner | 414/21 |
| 7,090,070 B2 * | 8/2006 | Linder | 198/841 |
| 7,182,202 B2 * | 2/2007 | Kalverkamp | 198/844.1 |
| 7,281,627 B1 | 10/2007 | Gunston | |
| 7,293,640 B1 * | 11/2007 | Aulick et al. | 198/817 |
| 7,293,643 B2 | 11/2007 | Burkhard | |
| 7,334,677 B2 | 2/2008 | Mader | |
| 7,377,378 B2 * | 5/2008 | Cash, III | 198/803.11 |
| 7,431,147 B2 * | 10/2008 | Reuteler et al. | 198/732 |
| 7,581,637 B2 * | 9/2009 | Lenherr et al. | 198/728 |
| 7,637,367 B1 * | 12/2009 | Cannell | 198/465.3 |
| 7,767,070 B2 * | 8/2010 | Orosz et al. | 204/471 |

* cited by examiner

*Primary Examiner* — Joe Dillon, Jr.
(74) *Attorney, Agent, or Firm* — Coats & Bennett, P.L.L.C.

(57) ABSTRACT

A chain link conveyor for use in material handling equipment such as a feed cart. The chain link conveyor comprises a series of sprockets and a pair of spaced apart chains trained around the sprockets. Each chain includes a series of interconnected links. Each link comprises a pair of sidebars and an interconnecting cross bar along with a pair of hooks that function to connect consecutive links and also function to form a sprocket centering gap that receives and guides respective sprockets through the link as the links moves over the sprockets. Various implementations of the chain link conveyor can be made. In one implementation the chain link conveyor is disposed in a feed cart.

8 Claims, 5 Drawing Sheets

CHAIN LINK CONVEYOR FOR USE IN MATERIAL HANDLING EQUIPMENT

FIELD OF THE INVENTION

The present invention relates to conveyors and more particularly to a chain link conveyor for use in material handling equipment such as feed carts.

BACKGROUND OF THE INVENTION

Chain link conveyors for conveying material have normally incorporated non-precision chains. These chains include a series of interconnected links. Historically, the chain links have been run on wide sprockets where the sprockets are effectively centered by the sidebars of the respective chain links. Generally, non-precision chains have normally included a special attachment link provided at intervals along the chain for use in connecting to slats or other structures connected to the chains for carrying or conveying material. In some cases, the attachment of the slats or other structure is made by the end user. Generally, non-precision chains have been made using a formed piece of flat steel or similar material which involves a substantial amount of forming and which limits the types of material that can be used for manufacturing the chain links. In some cases, a rod is formed to shape the link. For example, one type of chain is often referred to as the T-rod chain. The T-rod chain is generally made up of a formed rod with hooks to connect the links and is centered by a wide sprocket contacting the sidebars of the link.

In many applications it is desirable to manufacture chains of stainless steel. Non-precision chains that are formed from a flat steel are not conducive to being made of stainless steel because of the extensive forming that is involved in the process. Stainless steel because of its characteristics does not form easily and will crack and break if the forming action is too aggressive. Non-precision chains that use a wide sprocket require special attachment links to be installed in order to fix an attachment. T-rod chains which run on a wide sprocket can require attachments that are made by welding the attachment to the link.

Therefore, there is a need for a precision chain for use in chain link conveyors that can be constructed of various materials including stainless steel and which is durable and lightweight.

SUMMARY OF THE INVENTION

A chain link conveyor is disclosed and includes one or more chains trained around a series of sprockets. Each chain includes a series of consecutive interconnected links with each link including a pair of sidebars, a cross bar and a pair of hooks that interconnect consecutive links. The hooks are spaced apart to form a sprocket centering gap that includes a width substantially less than the width of the sidebars of the link. The sprocket centering gap engages respective sprockets, which are relatively thin compared to the width of the links, and guides the sprockets through the sprocket centering gap and maintains a spatial relationship between the sprockets and the sidebars as the links pass over the sprockets.

In one embodiment, the chain link conveyor described above is incorporated into a powered feed cart that can be utilized to haul and disburse feed for consumption by animals.

DESCRIPTION OF EXEMPLARY EMBODIMENTS

Figure 2:
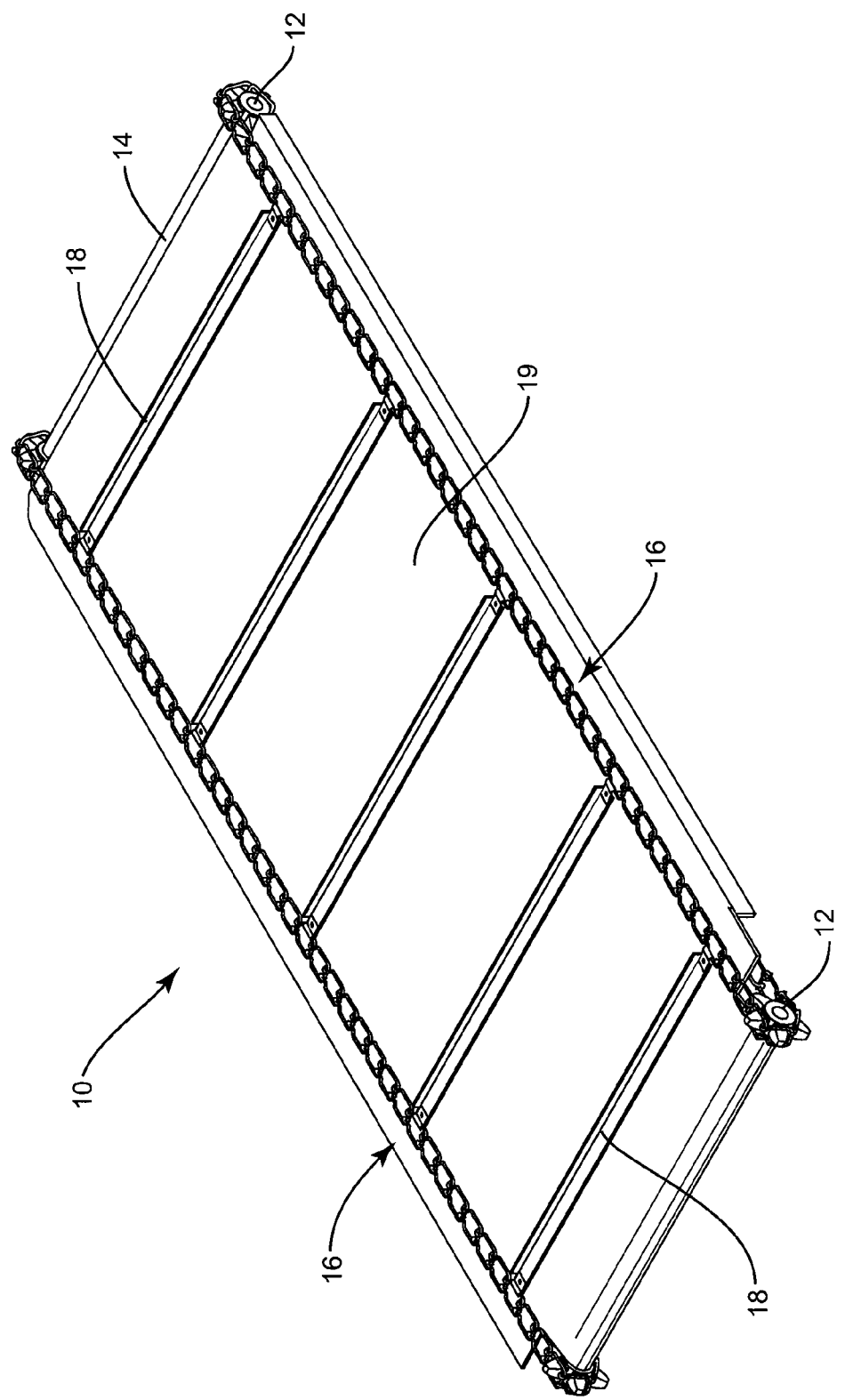
FIG. 2 is a perspective view of a chain link conveyor.
Figure 3:
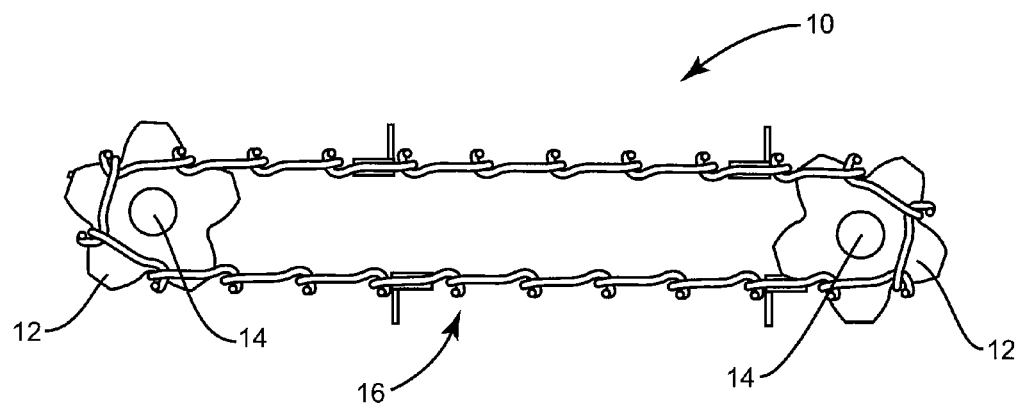
FIG. 3 is a schematic side elevational view showing portions of a chain link conveyor.
Figure 4:
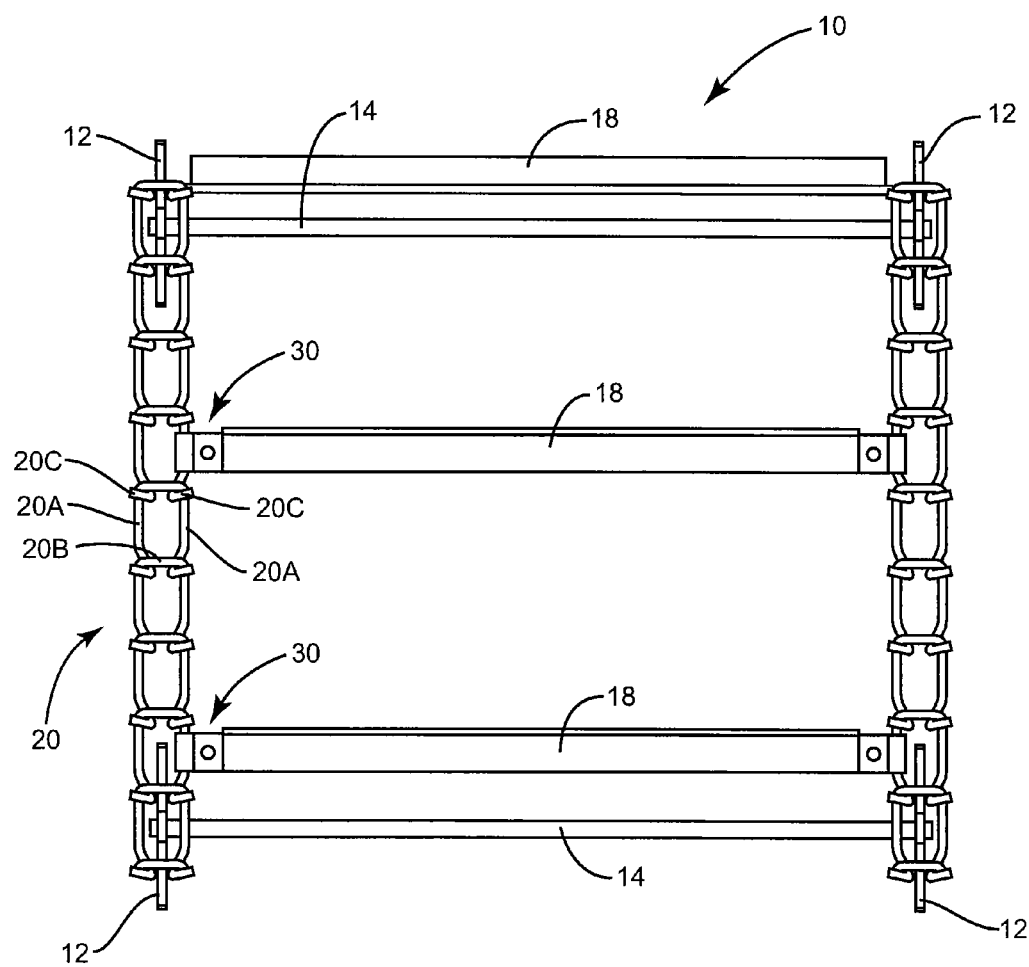
FIG. 4 is a plan view of the chain link conveyor shown in FIG. 3.

With further reference to the drawings, a chain link conveyor is shown therein and indicated generally by the numeral 10. As will be appreciated from subsequent portions of this disclosure, the chain link conveyor 10 is designed to move material or goods and is particularly adapted to be incorporated into a variety of material handling equipment. FIG. 2 depicts the chain link conveyor 10. Chain link conveyor 10 includes a series of sprockets 12. In the case of the FIG. 2 embodiment, there is provided a shaft 14 at the end of each conveyor and a pair of sprockets 12 are secured to the shaft for rotation about the axis of the shaft. A pair of spaced apart chains 16 is trained around the sprockets 12. Typically, at least one shaft 14 is driven which in turn drives the sprockets thereon and drives the chains 16 trained around the sprockets. In the case of the embodiment shown in FIG. 2, extending between the chains 16 is a structure that carries or moves material. In this case, the structure is referred by the numeral 18 and is interconnected between chains 16. More particularly, in the embodiment illustrated in FIG. 2 the structure includes a series of slats 18. It should be noted that in some cases, the structure for actually moving the material may be secured to a single chain and extend outwardly from each side thereof. See the exemplary conveyor shown in FIG. 6. Returning to FIG. 2, the chain link conveyor 10 is disposed adjacent a bottom or support structure 19. In this case, the slats 18 move over the bottom 19 and move material towards one end of the conveyor 10.

Figure 5:
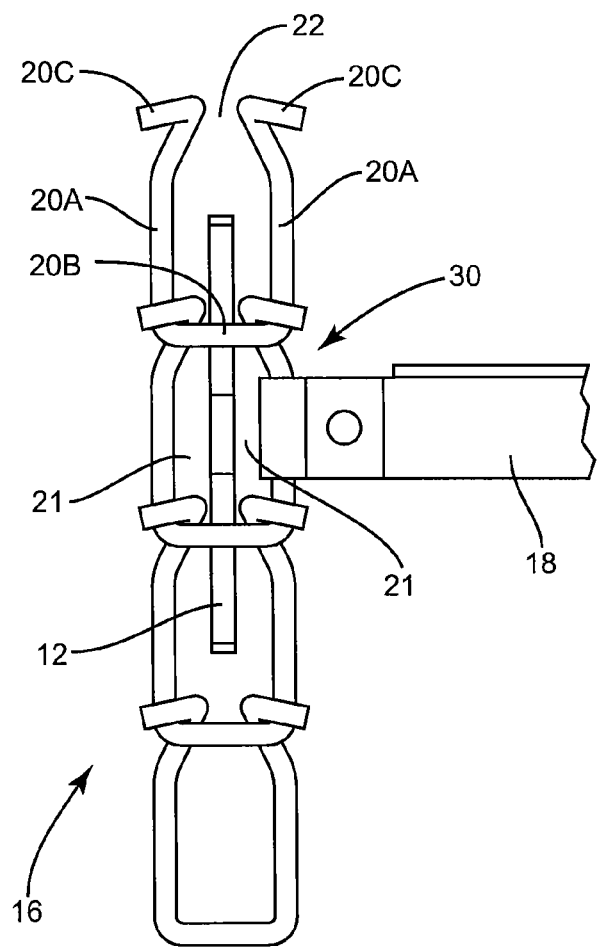
FIG. 5 is a fragmentary plan view of a portion of a chain link conveyor showing one chain trained around the sprocket.
Figure 7:
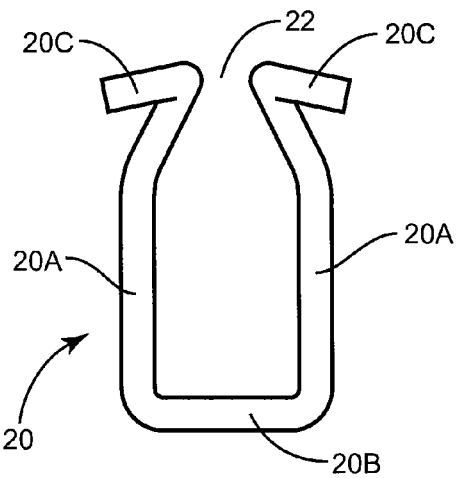
FIG. 7 is a plan view of a link that forms a part of a chain.
Figure 11:
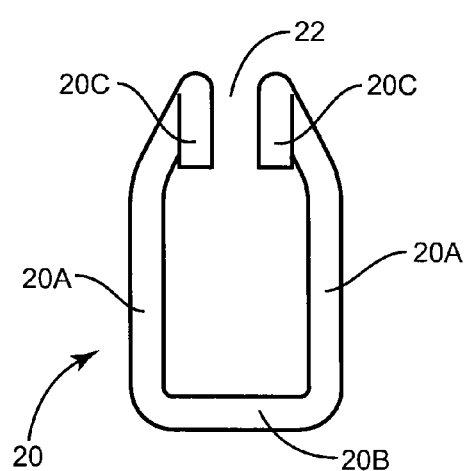
FIG. 11 is a plan view of an alternate link design.
Figure 8:
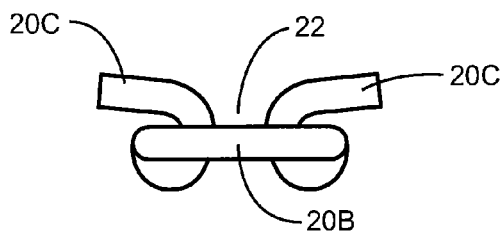
FIG. 8 is an end view of the link shown in FIG. 7.

Each chain 16 includes a series of interconnected links, each link in the drawings being indicated generally by the numeral 20. Links 20 can be formed or fabricated from various materials including stainless steel. With particular reference to FIGS. 5, 7 and 11, each link 20 includes a pair of spaced apart sidebars 20A. Interconnecting the sidebars 20A about one end of the link 20 is a cross bar 20B. Formed about the opposite end of the link 20 is a pair of hooks 20C. In the embodiment illustrated herein, the sidebars 20A, cross bar 20B and hooks 20C are integrally formed from a single piece of material. Hooks 20C serve multiple functions. First, hooks 20C are operative to connect to an adjacent link 20. As seen in FIG. 5, the hooks 20C of one link interconnect and extend around the adjacent link. More particularly, in the design illustrated in FIG. 5, the hooks 20C extend underneath the cross bar 20B of an adjacent link and curl upwardly around an area of the link where a respective sidebar 20A joins the cross bar 20B. Note in the FIG. 5 embodiment where the hooks of each link project outwardly with respect to the sidebars 20A of that link. As discussed below, the hooks 20C further function to center and guide the sprockets 12 through the respective links 20 as the links pass over the sprockets 12. In this regard, as seen in the drawings, the hooks 20C are spaced apart. The space between the hooks 20C of each link is referred to as a sprocket centering gap 22. Note that the centering gap 22 is spaced inwardly from the sidebars 20A and that the width of the gap 22 is substantially less than the width or distance between the sidebars 20A. As seen in FIG. 5, the design of the hooks 20C effectively maintains the sprocket 20 centered with respect to the chain 16 and its respective links 20. This is because the hooks 20C engage and constrain the sprocket 12 to move through the sprocket centering gap 22. As seen in FIG. 5, when the chain 16 is trained around a sprocket 12 at least two links 20 are engaged with the sprocket. Hooks 20C of two consecutive links 20 center the sprocket 12 and maintain the sprocket inwardly of the sidebars 20A. Thus, there is created a space 21 between the sprocket 12 and the respective sidebars 20A of the link. See FIG. 5. This prevents the sprocket 12 from engaging and creating interference with the sidebars 20A. Furthermore, it permits connectors 30 to be wrapped around and securely connected to the sidebars 20A without interference with the sprockets 12.

FIGS. 7 and 11 show two embodiments or designs for the links 20. Note in each case that the hooks 20C extend from and are integral with the sidebars 20A. In the case of the FIG. 7 embodiment, note that each hook 20C as it extends from the sidebar 20A extends at least slightly inwardly and then curls upwardly and thereafter projects outwardly. Hooks 20C are dimensioned to engage the cross bar 20B of an adjacent link 20 and to securely connect therewith such that the links 20 of the chain 16 remain connected and intact as the chain link conveyor 10 moves material. In the case of the hooks 20C and the embodiments shown in FIG. 7, each hook includes a first portion that extends inwardly from an end portion of a respective sidebar 20A. A second portion of the hook 20C tends to curl and form at least a part of a hook shape enabling the hook to receive a respective cross bar 20B. A third portion projects from the curled second portion of the hook and in the case of the FIG. 7 embodiment, projects outwardly with respect to the link. The FIG. 11 embodiment is similar except that the final portion of each hook 20C projects or extends generally parallel with the sidebars 20A of that respective link. As seen in FIG. 11, the final or end portions of the hooks 20C project towards the cross bar 20B of that link.

Figure 9:
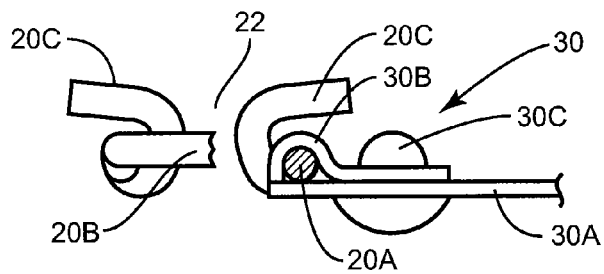
FIG. 9 is a partial sectional view showing a connector connected to a link of the chain.
Figure 10:
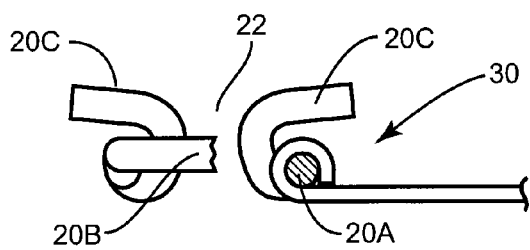
FIG. 10 is a partial sectional view showing an alternative embodiment for the connector and how it connects to a chain link.

As discussed above, by utilizing a relatively narrow sprocket 12 and providing a relatively large space or distance between the sidebars 20A, fasteners or connectors can be easily secured to the sidebars 20A without there being significant interference between the sprockets 12 and the sidebars 20A. Various forms of fasteners and connectors can be used to connect to the links 20. Examples of fasteners or connectors are shown in FIGS. 9 and 10. In both of these cases, the connector, indicated generally by the numeral 30, wraps around or curls around a substantial portion of the cross bar 20A. More particularly, at least a portion of the connector extends around the inside area of the cross bar 20A. In the case of the FIG. 9 embodiment, the connector 30 includes a plate 30A and a clamp 30B secured together by a fastener 30C. Note that the clamp 30B curls or wraps around the sidebar 20A. This enables connections to be made quickly and easily.

Connector 30 shown in FIG. 10 is simply a connector that is curled, wrapped or crimped around the sidebar 20A. Various approaches can be utilized to achieve the connection shown in FIG. 10. As seen in FIG. 10, the connector 30 curls or wraps around the sidebar 20A and typically extends around the inside area of the sidebar 20A.

Connectors 30 referred to herein can be integral with end portions of the slats 18 or other structure extending between the chains 16. In the alternative, the connectors 30 can be separate and distinct from the structure interconnected between the chains 16 and can in turn be fastened or secured to such structures as slats 18.

Figure 6:
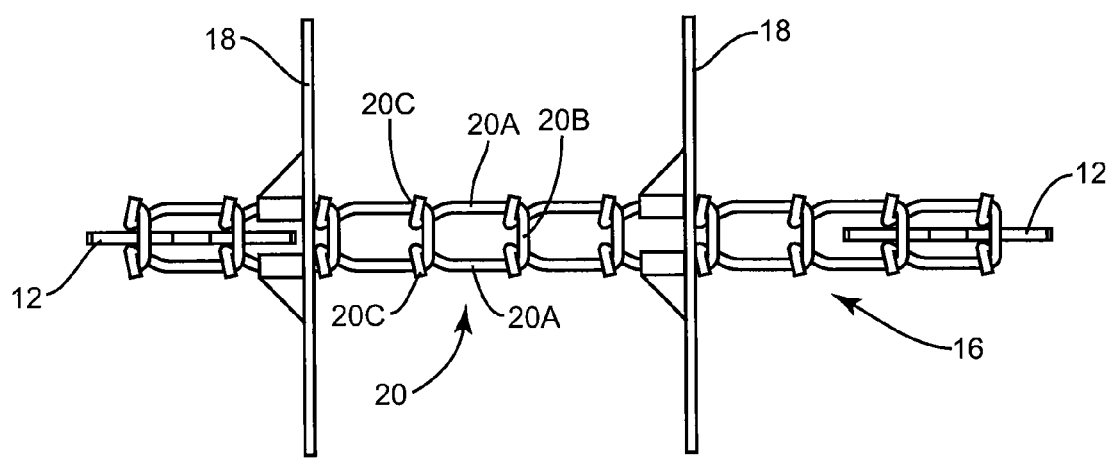
FIG. 6 is a fragmentary plan view showing a portion of a chain link conveyor having a transverse structure secured across the chain for conveying or moving material.

In the embodiment illustrated in FIG. 2, the chain link conveyor 10 includes two spaced apart chains 16. In other embodiments, there may be a single chain 16 where the structure or slats 18 for moving material is secured as shown in FIG. 6. In this case, the slats or carrying structure 18 extends transversely across the chain 16 shown in FIG. 6.

Figure 1:
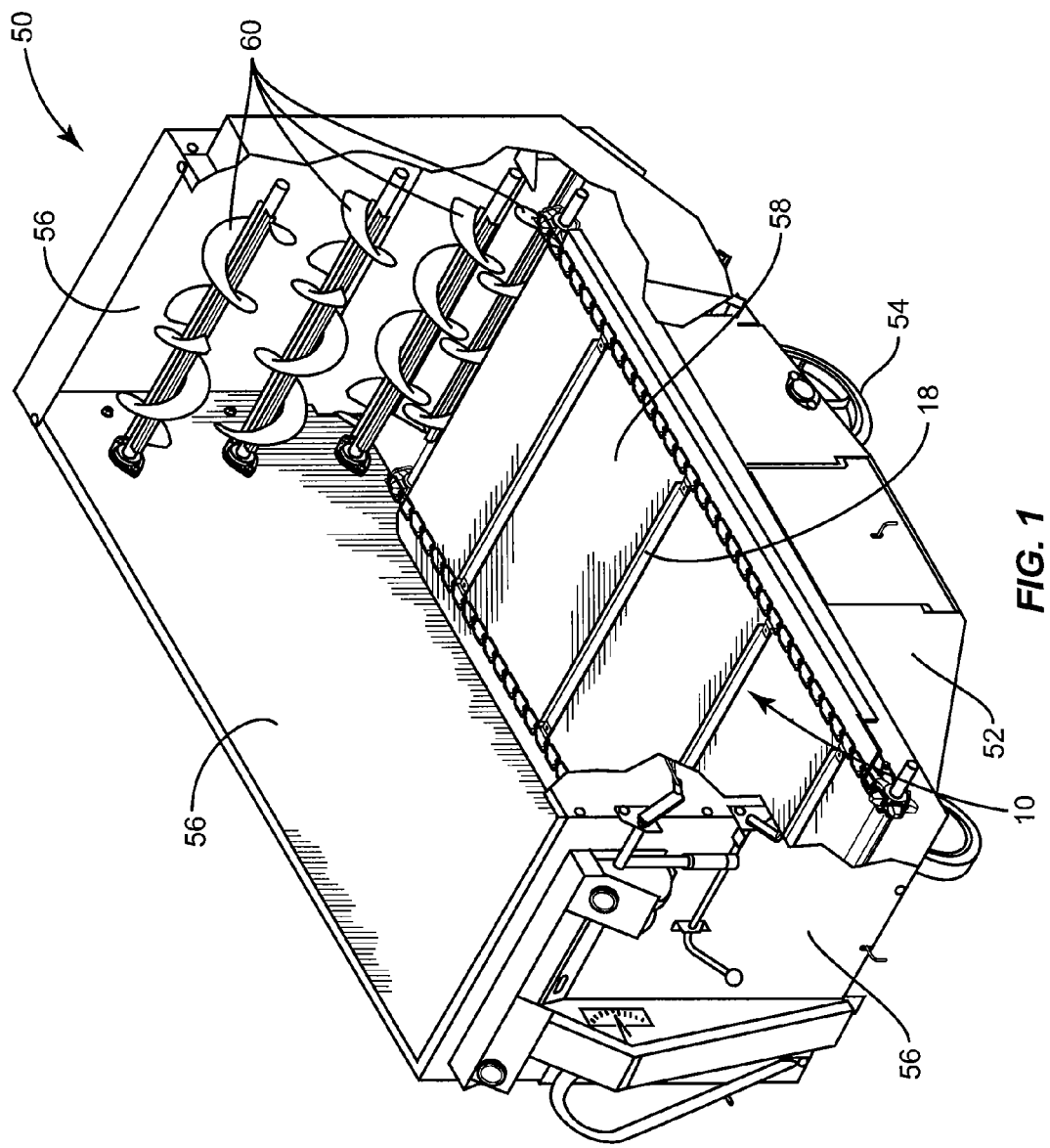
FIG. 1 is a perspective view of a feed cart showing portions broken away to illustrate the chain link conveyor contained therein.

Turning to FIG. 1, one implementation for the chain link conveyor 10 discussed above is in a feed cart. The feed cart is shown in FIG. 1 and indicated generally by the numeral 50. Feed cart 50 includes an undercarriage chassis 52 having a plurality of wheels 54 secured thereto for supporting the feed cart 50 and permitting the feed cart to be moved from one location to another location.

Feed cart 50 includes a feed box for holding feed. The feed box includes a series of walls 56 and a bottom 58.

Disposed about one end of the feed cart 50, within the feed box, is a series of augers with each auger being indicated by the numeral 60. Various types and numbers of augers may be used. In this case, the lower auger is disposed in an auger trough and is utilized to convey feed out an opening provided in one side of the feed cart.

To move or convey feed towards the augers, the feed cart 50 shown in FIG. 1 includes the chain link conveyor 10 described herein. The feed box includes a bottom 58, which is sometimes referred to as a false bottom. The slats 18 of the chain link conveyor 10 slide over the bottom 18 and can be selectively powered to move material from one end of the feed box towards the augers 60.

Details of the feed cart 50 are not dealt with herein because the general construction and structure of such a feed cart is known by those skilled in the art. For a more complete and unified understanding of a feed cart, one is referred to the disclosure found in U.S. Pat. No. 3,760,770, the disclosure of which is expressly incorporated herein by reference. Suffice it to say that the feed cart is a powered feed cart. That is, in some cases the feed cart is battery powered which permits the batteries, through a hydraulic or hydrostatic drive for example, to drive the wheels 54 of the feed cart as well as the augers 60 and chain link conveyor 10.

In the preceding discussion, the chain 16 has been viewed in the context of a conveyor. However, the chain 16 described above and shown in the drawings has other applications other than conveyor applications. For example, the chain 16 can be used as a drive chain or gathering chain. Such chains have applications in the food industry because compared to roller type chains, they require no lubricant which might contaminant food. They are easy to clean as there are no hidden areas and the chain and sprockets can be made of stainless steel. The chain 16 has applications in corrosive environments because compared to roller type chains, there is no freezing, rusting or binding of the links. In addition, even the links that comprise the chain can be used to form pivot links, hinged links, connector links, and detachable links.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A chain link conveyor, comprising:
    a series of spaced apart sprockets;
    at least one chain trained around the sprockets;
    a support structure moveable by the chain for pushing a load or moving material over a support surface as the chain is driven;
    the chain having a series of interconnected links with each link having a pair of sidebars, a crossbar, and a pair of spaced apart hooks for connecting to another link;
    at least one connector for connecting the support structure to one chain link, each connector wrapping substantially around a respective sidebar of a chain link;
    a centering gap formed between the hooks of each chain link for centering the sprockets as the respective chain links engage and move over the sprockets;
    the centering gap having a width substantially less than the distance between opposed sidebars of the chain links; and
    wherein the width of the sprockets are relatively narrow compared to the distance between the sidebars of the respective links such that as the sprockets engage respective chain links having a connector connected thereto, there is a space defined between the sprockets and the adjacent connectors and sidebars.

2. The chain link conveyor of claim 1 wherein each hook extends slightly inwardly from a respective sidebar and turns so as to extend either slightly outwardly or generally parallel to the sidebars.

3. The chain link conveyor of claim 1 including a pair of spaced apart chains and wherein the support structure for carrying a load or moving material comprises a series of slats interconnected between the chains.

4. The chain link conveyor of claim 3 wherein each slat includes a connector disposed on an end portion thereof and wherein each connector wraps around at least a portion of a sidebar of a link.

5. The chain link conveyor of claim 1 wherein each connector includes a single piece of material curled around a substantial portion of a sidebar or a multi-piece connector secured together such that at least a portion of a multi-piece connector extends substantially around a sidebar.

6. The chain link conveyor of claim 1 wherein the sidebars and crossbar of each link assume a general U-shape configuration and wherein each hook extends from an end portion of one sidebar opposite the crossbar and wherein each hook includes a first portion that extents inwardly relative to the sidebars and wherein the centering gap is defined by the hooks.

7. The chain link conveyor of claim 1 wherein the distance between the hooks is substantially less than the distance between the adjacent sidebars of each link and wherein the hooks formed in consecutive links engage the sprockets and center the sprockets with respect to the chain such that the sprockets are maintained inwardly from the sidebars of the links and generally prevent ongoing interference between the sprocket and the sidebars of the links.

8. The chain link conveyor of claim 1 wherein the hooks of each link engage respective sprockets of the chain link conveyor as the links pass over the sprockets and wherein the hooks urge the respective sprockets into and through the sprocket centering gap defined between the hooks of each link.

* * * * *